(12) United States Patent
Chanda et al.

(10) Patent No.: US 11,367,111 B2
(45) Date of Patent: *Jun. 21, 2022

(54) METHOD AND SYSTEM FOR DEPLOYING ARRANGEMENTS OF PAYLOADS BASED UPON ENGAGEMENT OF WEBSITE VISITORS

(71) Applicant: Synqy Corporation, Pleasant Hill, CA (US)

(72) Inventors: Nikolaus Chanda, Concord, CA (US); Michael Weissman, Danville, CA (US); David Mosby, San Ramon, CA (US); John Hoye, Walnut Creek, CA (US)

(73) Assignee: Synqy Corporation, Pleasant Hill, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,927

(22) Filed: Sep. 13, 2021

(65) Prior Publication Data

US 2022/0067794 A1 Mar. 3, 2022

Related U.S. Application Data

(60) Continuation of application No. 15/925,163, filed on Mar. 19, 2018, now Pat. No. 11,120,482, which is a (Continued)

(51) Int. Cl.
*G06Q 30/02* (2012.01)
*H04L 9/40* (2022.01)

(52) U.S. Cl.
CPC ..... *G06Q 30/0276* (2013.01); *G06Q 30/0241* (2013.01); *G06Q 30/0244* (2013.01);
(Continued)

(58) Field of Classification Search
None
See application file for complete search history.

(56) References Cited

U.S. PATENT DOCUMENTS

| 6,938,170 B1 | 8/2005 | Kraft et al. |
| 7,747,465 B2 | 6/2010 | Srinivasan et al. |

(Continued)

FOREIGN PATENT DOCUMENTS

IN 1512/DEL/2004 A 8/2004

OTHER PUBLICATIONS

Shelly Ellis, "Interactive Advertising: Way Beyond Shooting Ducks", retrieved from https://marketingland.com/interactive-advertising-from-shooting-ducks-to-now-22343, available on Sep. 24, 2012 (Year: 2012).*

(Continued)

*Primary Examiner* — Sam Refai
(74) *Attorney, Agent, or Firm* — Perkins Coie LLP

(57) ABSTRACT

A digital brand asset system is provided enabling a brand owner to create, distribute, maintain, manage, merchandise and analyze smart brand assets. The system enables distribution and sharing of smart brand assets across the websites. The websites can host webpages containing codes representing the smart brand assets. When a user device retrieves a webpage from one of the websites and renders the webpage, it executes the codes and requests the content of the smart brand assets from a brand asset server. Through the brand asset server, a brand owner can control the content and the presentation of the smart brand asset hosted by the websites, based on various factors such as previous click through rates, aggregated shopper behaviors, geographical locations of the websites or website visitors, categorized types of websites, blacklist of websites.

28 Claims, 14 Drawing Sheets

Related U.S. Application Data division of application No. 14/092,721, filed on Nov. 27, 2013, now Pat. No. 9,922,349.

(60) Provisional application No. 61/730,421, filed on Nov. 27, 2012.

(52) U.S. Cl.
CPC ..... *G06Q 30/0254* (2013.01); *G06Q 30/0255* (2013.01); *G06Q 30/0277* (2013.01); *H04L 63/08* (2013.01); *H04L 63/12* (2013.01)

(56) References Cited

U.S. PATENT DOCUMENTS

| | | | |
|---|---|---|---|
| 7,856,430 B1 | 12/2010 | Pollastro | |
| 7,877,463 B2 | 1/2011 | Lentini et al. | |
| 8,566,154 B2 | 10/2013 | Merriman et al. | |
| 8,631,473 B2* | 1/2014 | Bhatia | H04N 21/4826 726/17 |
| 8,694,610 B2 | 4/2014 | Jungck | |
| 8,700,630 B2* | 4/2014 | Wexler | G06F 16/9038 707/738 |
| 8,799,200 B2 | 8/2014 | Lahav | |
| 8,856,869 B1 | 10/2014 | Brinskelle | |
| 9,106,607 B1 | 8/2015 | Lepeska et al. | |
| 9,292,361 B1 | 3/2016 | Chitilian et al. | |
| 9,305,098 B1 | 4/2016 | Willingham et al. | |
| 9,912,718 B1 | 3/2018 | Lepeska et al. | |
| 10,636,052 B2 | 4/2020 | Moran et al. | |
| 10,679,259 B2 | 6/2020 | Chanda et al. | |
| 2002/0046096 A1 | 4/2002 | Srinivasan et al. | |
| 2002/0078136 A1 | 6/2002 | Brodsky et al. | |
| 2002/0147637 A1 | 10/2002 | Kraft et al. | |
| 2003/0046165 A1 | 3/2003 | Topel et al. | |
| 2004/0093327 A1 | 5/2004 | Anderson et al. | |
| 2004/0260767 A1 | 12/2004 | Kedem et al. | |
| 2005/0050097 A1 | 3/2005 | Yeh et al. | |
| 2005/0091111 A1 | 4/2005 | Green et al. | |
| 2007/0050252 A1* | 3/2007 | Jain | G06Q 30/0257 705/14.55 |
| 2007/0239542 A1 | 10/2007 | Shapiro | |
| 2007/0250468 A1 | 10/2007 | Pieper | |
| 2008/0004960 A1* | 1/2008 | Coomer | G06Q 30/0277 705/14.66 |
| 2008/0077556 A1 | 3/2008 | Muriente | |
| 2008/0140626 A1 | 6/2008 | Wilson | |
| 2008/0151315 A1 | 6/2008 | Flake et al. | |
| 2008/0313031 A1 | 12/2008 | Li et al. | |
| 2009/0006213 A1 | 1/2009 | Lerman et al. | |
| 2009/0006214 A1 | 1/2009 | Lerman et al. | |
| 2009/0012863 A1 | 1/2009 | Saephan | |
| 2009/0037355 A1 | 2/2009 | Brave et al. | |
| 2009/0070687 A1 | 3/2009 | Mazzaferri | |
| 2009/0094137 A1 | 4/2009 | Toppenberg et al. | |
| 2009/0119329 A1 | 5/2009 | Kwon et al. | |
| 2009/0198662 A1 | 8/2009 | Prabhakar et al. | |
| 2009/0327914 A1 | 12/2009 | Adar et al. | |
| 2010/0030752 A1 | 2/2010 | Goldentouch | |
| 2010/0100925 A1 | 4/2010 | Hinton | |
| 2010/0180296 A1 | 7/2010 | Hendricks et al. | |
| 2010/0332513 A1 | 12/2010 | Azar et al. | |
| 2010/0332993 A1 | 12/2010 | Bousseton et al. | |
| 2011/0071997 A1 | 3/2011 | Sullivan et al. | |
| 2011/0082755 A1 | 4/2011 | Itzhak | |
| 2011/0125587 A1 | 5/2011 | Netzer et al. | |
| 2011/0161407 A1 | 6/2011 | Juda et al. | |
| 2011/0161847 A1 | 6/2011 | Chaikin et al. | |
| 2011/0208585 A1 | 8/2011 | Daboll et al. | |
| 2011/0282860 A1 | 11/2011 | Baarman et al. | |
| 2011/0283359 A1 | 11/2011 | Prince et al. | |
| 2012/0011432 A1 | 1/2012 | Strutton | |
| 2012/0016749 A1 | 1/2012 | Lisbakken | |
| 2012/0022951 A1 | 1/2012 | Tolompoiko et al. | |
| 2012/0095837 A1 | 4/2012 | Bharat et al. | |
| 2012/0254149 A1 | 10/2012 | Ramsay | |
| 2012/0259882 A1 | 10/2012 | Thakur et al. | |
| 2012/0284252 A1 | 11/2012 | Drai et al. | |
| 2012/0290399 A1 | 11/2012 | England et al. | |
| 2013/0110637 A1 | 5/2013 | Bott | |
| 2013/0166580 A1 | 6/2013 | Maharajh et al. | |
| 2013/0287305 A1 | 10/2013 | Dhanda et al. | |
| 2014/0075283 A1 | 3/2014 | Coursol et al. | |
| 2014/0122255 A1 | 5/2014 | Snyder | |
| 2014/0229271 A1 | 8/2014 | Clapp et al. | |
| 2015/0213481 A1 | 7/2015 | Yuan | |
| 2015/0254732 A1 | 9/2015 | Snyder | |
| 2017/0116640 A1 | 4/2017 | Sah et al. | |
| 2018/0218389 A1* | 8/2018 | Walker | G06Q 30/0242 |

OTHER PUBLICATIONS

"Brand Website Activity Impact Analysis: Do Page Views Drive Rx Outcomes?", by Portman et al. Merkle. Pharmaceutical Management Science Asscotion (PMSA). Sep. 15, 2011. (Year: 2011).

"How To Design Style Guides For Brands And Websites", by Kat Neville. Smashing Magazine, Jul. 21, 2010. (Year: 2010).

Dong, Qin, "Search-Engine_Oriented Theme Crawler Design", Yancheng Institute of Technology, Yancheng, Jiangsu Province, China, International Conference on System Science, Engineering Design and Manufacturing Informatization, IEEE Computer Society, 2010, pp. 303-306., pp. 303-306.

Ellis, Shelley, "Interactive Advertising: Way Beyond Shoot Ducks", retrieved from https://marketingland.com/interactive-advertising-from-shooting-ducks-to-now-22343, available on Sep. 24, 2012 (Years: 2012).

Vetro, Salvatore, "Observer Design Pattern Using JavaScript", Apr. 26, 2006.

Wang, Nan, "Design and Implementation of a Crawling System in Shopping Search Engine", School of Journalism and Communication, Tsinghua University, Beijing, China, Second International Workshop on Computer Science and Engineering, 2009, pp. 212-216., pp. 212-216.

Zhou, Jingyu, et al., "An Analysis of URLs Generated from JavaScript Code", IEEE/ACIS 11th International Conference on Computer and Information Science, 2021, pp. 688-693., pp. 688-693.

Ajax Crawler, Paul Suganthan G C, 978-1-4673-2149-5/12/$31.009 © 2012 IEEE.

An Approach for Crawling Dynamic WebPages Based on Script Language Analysis, Yao et al., 2012 ninth Web Information Systems and Applications Conference, 978-0-7695-4819-7/12.

Embedding Semantic Annotations into Dynamic Web Contents, Navas-Delgado et al., Proceedings of the 15th International Workshop on Database and Expert Systems Applications (DEXA'04) 1529-4188/04.

USPTO, Notice of Allowance dated Feb. 22, 2022 for U.S. Appl. No. 16/862,081, 10 pages.

USPTO, Notice of Allowance dated Feb. 7, 2022 for U.S. Appl. No. 16/861,911, 15 pages.

* cited by examiner

METHOD AND SYSTEM FOR DEPLOYING ARRANGEMENTS OF PAYLOADS BASED UPON ENGAGEMENT OF WEBSITE VISITORS

CROSS REFERENCE TO RELATED APPLICATIONS

This application is a continuation of U.S. patent application Ser. No. 15/925,163, filed Mar. 19, 2018, which is a divisional of U.S. patent application Ser. No. 14/092,721, filed Nov. 27, 2013 and titled "METHOD AND SYSTEM FOR THE DISTRIBUTION, MAINTENANCE, MANAGEMENT, MERCHANDISING AND ANALYSIS OF DIGITAL BRAND ASSETS ON THE INTERNET," which claims benefit of U.S. Provisional Patent Application No. 61/730,421, filed Nov. 27, 2012, the entirety of which is incorporated herein by this reference thereto.

BACKGROUND OF THE INVENTION

Field of the Invention

The invention relates to promoting and using brand assets online. More particularly, the invention concerns a framework for brand owners and website owners to control the way of distributing and maintaining brand assets being presented on the Internet.

Description of the Related Art

The Internet is a useful platform for brand owners to promote their brands using various brand assets. The brand assets can include images, videos, presentations, brochures (e.g., PDF or other formats), flash animations, software applications, widgets or other types of media related to the brands. Often, these brand assets are defined by rules as to how they are to be used. These rules are called brand guidelines. When brand owners use their brand assets, they have controls of how the brand assets are used and applied according to the brand guidelines.

In order to extend a brand's reach to a wider audience, a brand owner shares the brand assets with consumers, reseller partners, media, trade associations and other interested third parties for use on websites that are not managed or maintained by the brand owner.

Presently, the method for distributing and maintaining brand assets when they are shared with third parties is manual and disparate. FIG. 1 is a flow diagram showing the legacy process of distributing and managing brand assets. Once a brand asset has been created in step 101, the brand owner distributes the brand asset to its third party user via email (in step 102) or via an extranet (e.g., a website in step 104 and 106). Ultimately, the recipient of the brand asset uploads the asset into a website system and links the asset in code (e.g., HyperText Markup Language, "HTML") to the location of the file on the system in step 112. However, previous to publishing the brand asset, the recipient of the brand asset manipulates the brand asset to fit the website that is going to host the asset in step 110. Often, that manipulation violates the brand guidelines, which can potentially harm the equity of the brand. Such manipulation can include stretching images, placing them in places not approved by the brand owners, etc.

Due to the nature of the Internet, users of brand assets can source these assets by copying them from websites other than the brand owner's, in step 108. As a result, these users may use the brand assets that do not conform to the brand guidelines.

Brand assets often change since they represent products, which often receive updates or new models. As a result, brand assets can become out of date quickly. When a person sources an out-of-date brand asset and puts that asset on another website, the incorrect brand information is propagated throughout the Internet, which again harms the brand's equity. Maintaining the currency and correctness of brand assets on websites that are not managed by brand owners is a challenging task, because these brand owners lack visibility to where those brand assets exist on the Internet and lack the ability to remotely update and/or manage those brand assets.

When a brand owner wishes to promote its business on its own website, often multiple brand assets are presented together. For example, a product photograph may be marketed adjacent to a set of specifications, a brochure, a video or some other form of information about the brand and its products or services. This is often called merchandising. When a brand owner controls the website, it is easy for that owner to merchandise these brand assets in a consistent, attractive manner. However, when a brand owner wishes to promote its business on another company's website that is not owned or controlled by the brand owner, it is very difficult to consistently deliver brand assets that are well merchandised together, especially not within a specific, packaged area.

Brands are also used to apply credibility to the users of the brands. For example, a medical board certification or accreditation logo can increase the perceived value of the doctor who has such a certification. There is an association between the beneficiary of such accreditation (e.g., the doctor) and the website that represents that doctor. Today, the brand asset is simply an image file representing the brand logo for that certification and there is no authentication that the brand user is authorized to use the brand and there is no association between the website using the brand asset, the website owner authorized to use the brand asset and the company making the authorization.

Finally, brand owners have limited visibility regarding where these brand assets are used online, who is using those assets, how many people are viewing or interacting with those assets and under what condition those brand assets appear. This impacts the ability for brand owners to control those brand assets, value the brand assets, and evaluate the return on investment from the use of those brand assets.

SUMMARY OF THE INVENTION

A digital brand asset system allows a brand owner to create, distribute, maintain, manage, merchandise and analyze smart brand assets. The system enables the brand owner to better merchandise brands and products online, ensures brand consistency and currency, enforces compliance with brand guidelines, and delivers brand engagement across third-party controlled websites.

The system enables distribution and sharing of smart brand asset across the websites. The websites can host webpages containing codes representing the smart brand assets. When a user device retrieves a webpage from a website and renders the webpage, it executes the code and requests the content of the smart brand assets from a brand asset server. Through the brand asset server, a brand owner can control the content and the presentation of the smart brand asset hosted by the websites.

A smart brand asset is an interactive container of brand assets such as images, videos, interactive software code, product brochures, embed codes from other websites, and other items. A smart brand asset is represented by a unique embed code which is provided by the System. This embed code is placed on web pages, e.g., in lieu of an image reference, to represent the smart brand asset. When a web page containing a smart brand asset embed code is rendered, a computer script gets called to load the initial payload of the smart brand asset into a web browser. This payload is typically an image but can also be a piece of text, video or other brand asset object. Depending on how the smart brand asset is configured, the smart brand asset may launch a secondary payload of digital brand assets when the consumer interacts with the smart brand asset. These secondary assets can be displayed, for example in a lightbox or within the same page and location as the initial payload. A smart brand asset can include a single brand asset (i.e., the initial payload), or include multiple brand assets in multiple slides.

The brand asset server can control the content and presentation of the smart brand asset hosted on websites based on various factors. For instance, the factors can include, previous click through rates, aggregated shopper behaviors, geographical locations of the websites or website visitors, categorized types of websites, blacklist of websites.

The brand owner may further grant certain rights to brand partners. The brand asset server can determine the relationship between the identity of the brand partner and how the smart brand asset is being presented. For instance, after authentication, the brand asset server can enable the brand partner to add or remove the content of the smart brand asset, or to select the initial payload being presented first within the smart brand asset. The brand asset server can further assign groupings of smart brand assets that carry different content for different groups of brand partners.

DETAILED DESCRIPTION

Figure 1:
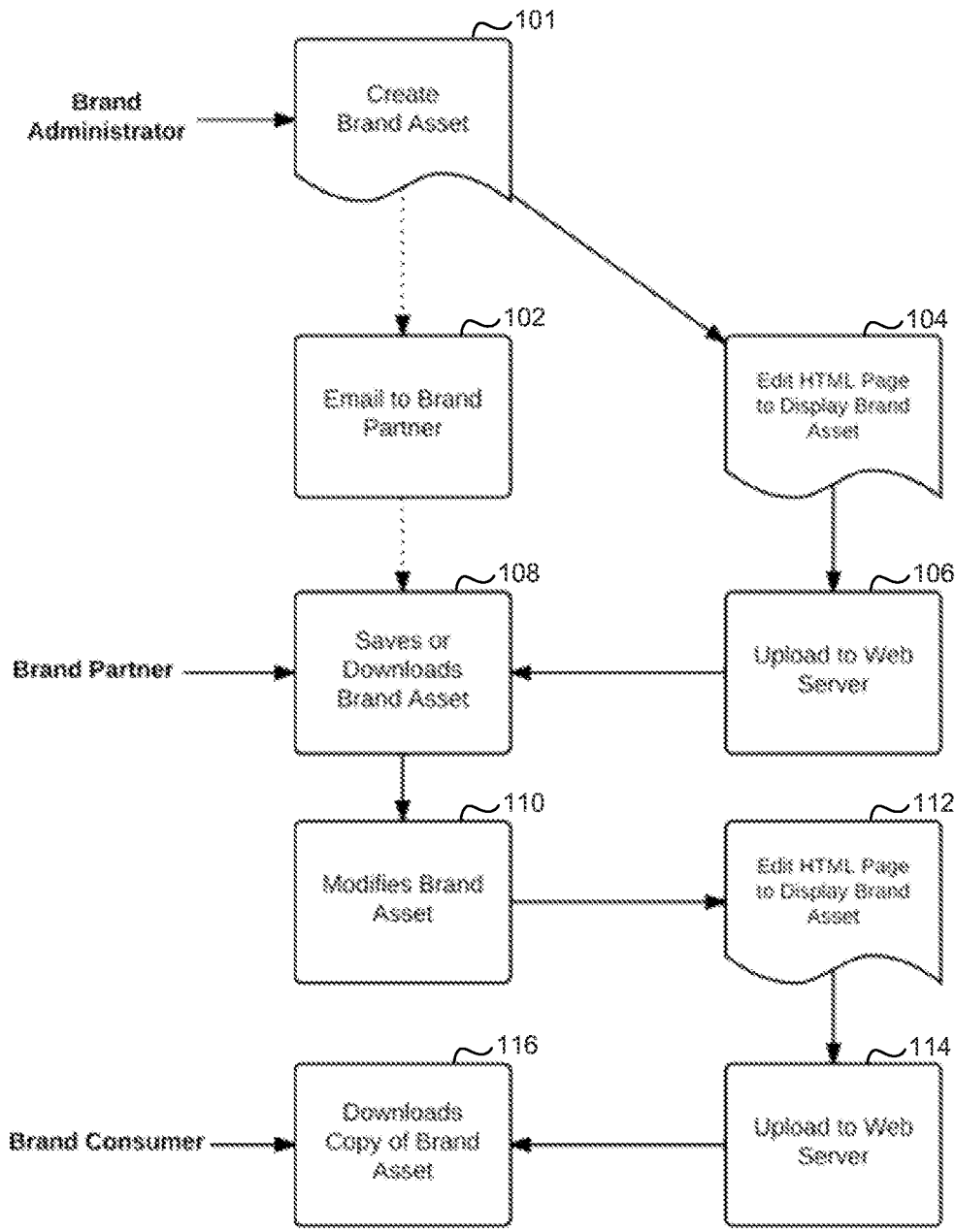
FIG. 1 is a flow diagram showing a legacy process of distributing and managing brand assets.

The nature, objectives, and advantages of the invention will become more apparent to those skilled in the art after considering the following detailed description in connection with the accompanying drawings.

Definitions

Terms used in the claims and specification are to be construed in accordance with their usual meaning as understood by one skilled in the art except and as defined as set forth below.

Brand Asset: A digital representation of a brand or a product identified by the brand. For example, a brand asset can include product hero shot, product brochure, textual content, image logo, video, training materials, etc.

Smart brand asset: An interactive container of brand assets. A smart brand asset ("SBA") is represented by an embed code including references to images, videos, interactive software code, product brochures, embed codes from other websites, and other items that can be placed on a website and accessed by a browser when deployed on a website. The smart brand asset is capable of delivering a controlled presentation of the brand assets determined by the brand owner.

Slide: A collection of digital content merchandised together. A slide typically includes one or more brand assets and/or other objects such as buttons or menus for web browsing navigation.

Payload: A collection of slides or a single slide.

Initial Payload: The slide that would be displayed when the smart brand asset first loads on a web page.

Secondary Payload: The Slide or Slides that would be displayed, e.g., in a lightbox, when a user interacts with the smart brand asset, e.g., by moving the mouse icon over or clicking on the smart brand asset.

Lightbox: An overlay showing objects that is displayed on top of a current web page. When the overlay is displayed, the rest of the web page content may be darkened.

System: A computer system as a whole that is used to create, configure, administer, and deliver payloads of smart brand assets.

Brand Owner: An individual or entity, or a representative of the individual or entity, who creates and publishes the smart brand assets and may be the owner of a given brand asset. The brand owner can be also responsible for creating other users of the system.

Brand Partner: An individual or entity who is a representative of a company that is a business partner to the brand owner. For example, a brand partner can be a distributor or a reseller. A bran partner can set filters on what will show up on their website or, on occasion what an anonymous administrator's web site will display (e.g., setting filters of which products a particular reseller can display on their site) and configure applications as well as site configurations.

Anonymous Administrator: An individual or entity who is an owner and/or administrator of a website that contains a smart brand asset but does not have the brand partner authorization (as assigned by the brand owner) to configure a given smart brand asset. Examples of anonymous administrators can be blog owners, publishers that publish articles containing a smart brand asset, resellers or dealers of a product that are known by the brand partner (e.g., a distributor) but do not necessarily have a business relationship with the brand owner. An anonymous administrator can configure certain aspects of the smart brand asset for their website only.

Site Owner: An individual or entity who has administrative responsibilities for updating websites that contain a smart brand asset. A site owner can be, e.g., a brand partner or anonymous administrator.

Consumer: A viewer of a smart brand asset presented on a web page. A consumer has no administration capability but may share the smart brand asset with other consumers if the smart brand asset is configured to be shareable.

Environment of Smart Brand Asset System

Figure 2:
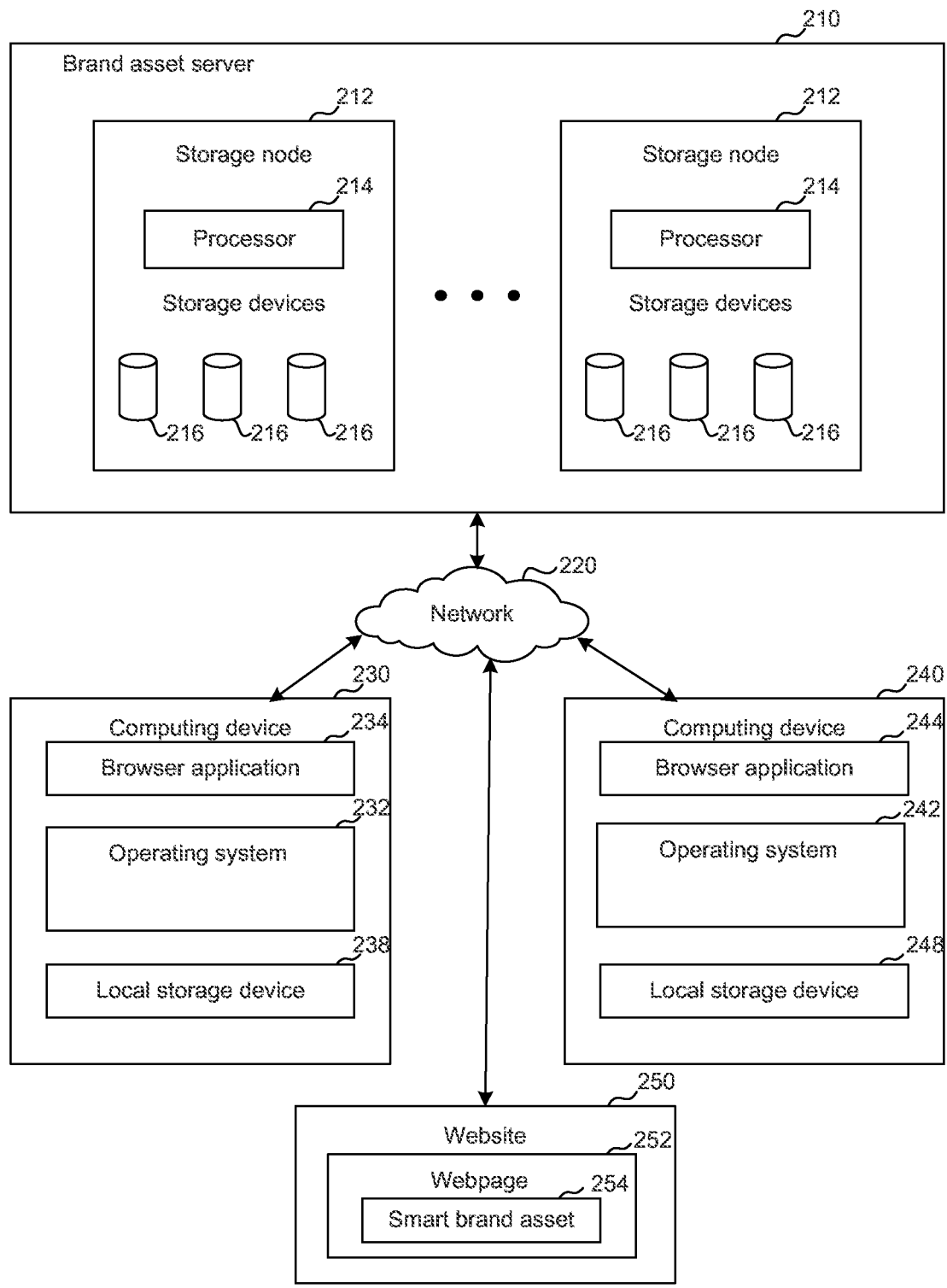
FIG. 2 is a block diagram of the components and interconnections of a smart brand asset system, according to an embodiment of the invention.

FIG. 2 is a block diagram of the components and interconnections of a smart brand asset system, according to an embodiment of the invention. The brand asset server 210 is responsible for creating, configuring, administering, and delivering payloads of smart brand assets. The brand asset server 210 is configured to communicate with the computing devices. In one embodiment, the brand asset server 210 can be a server cluster having computer nodes interconnected with each other by a network. The cloud server 210 can contain storage nodes 212. Each of the storage nodes 212 contains one or more processors 214 and storage devices 216. The storage devices can include optical disk storage, RAM, ROM, EEPROM, flash memory, phase change memory, magnetic cassettes, magnetic tapes, magnetic disk storage or any other computer storage medium which can be used to store the desired information.

The computing devices 230 and 240 can each communicate with the brand asset server 210 and a website 250 via network 220. The network 120 can be, e.g., the Internet. The website 250 can be owned by the brand owner or other entities that are not controlled by the brand owner. The website 250 hosts a webpage 252 which contain a code representing a smart brand asset 254. Although FIG. 2 illustrates two computing devices 230 and 240, a person having ordinary skill in the art will readily understand that the technology disclosed herein can be applied to a single computing device or more than two computing devices connected to the brand asset server 210 and website 250.

The computing device 230 includes an operating system 232 to manage the hardware resources of the computing device 230 and provides services for running browser application 234. The browser application 234 stored in the computing device 230 require the operating system 232 to properly run on the device 230. The computing device 230 includes at least one local storage device 238 to store the computer applications and user data. The computing device 230 or 240 can be a desktop computer, a laptop computer, a tablet computer, an automobile computer, a game console, a smart phone, a personal digital assistant, smart TV, set top box, DVR, Blu-Ray, residential gateway, over-the-top Internet video streamer, or other computing devices capable of running computer applications, as contemplated by a person having ordinary skill in the art.

The browser application 234 downloads the webpage 252 from the website 250. To render the webpage 252, the browser application 234 executes the code contained in the webpage 252, including the code representing the smart brand asset 254. Following the instructions of the code, the computing device 130 requests the content of the smart brand asset 254 from the brand asset server 210. The brand asset server can dynamically determine the content and the presentation of the smart brand asset 254, and deliver them to the computing device 230.

Figure 3:
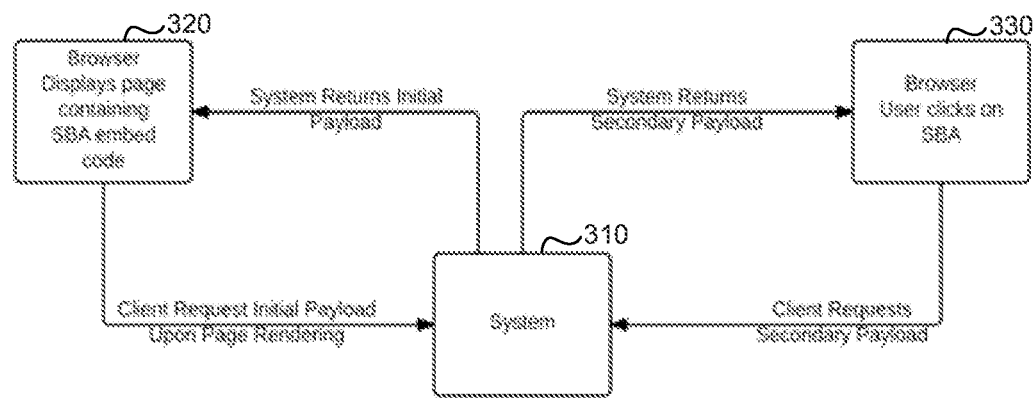
FIG. 3 is a block diagram of showing the interaction among the smart brand asset system and browser applications for displaying the smart brand asset, according to an embodiment of the invention.

FIG. 3 is a block diagram of showing the interaction among the smart brand asset system and browser applications for displaying the smart brand asset, according to an embodiment of the invention. A browser application 320 running a computing device loads and displays a webpage containing an SBA embed code. Upon rendering the webpage, the browser application 320 requests an initial payload of the smart brand asset from the system 310. In response, the system 310 returns an initial payload of the smart brand asset to the browser application 320.

The system 310 can further send secondary payloads of smart brand assets to computing devices running browser applications. For example, a browser application 330 showing the initial payload of the smart brand asset can receive a signal from its computing device indicating that the user of the device clicks on the smart brand asset. Accordingly, the browser application 330 request second payload of the smart brand asset from the system 310. In response, the system 310 can return the secondary payload to the browser application 330.

Figure 4:
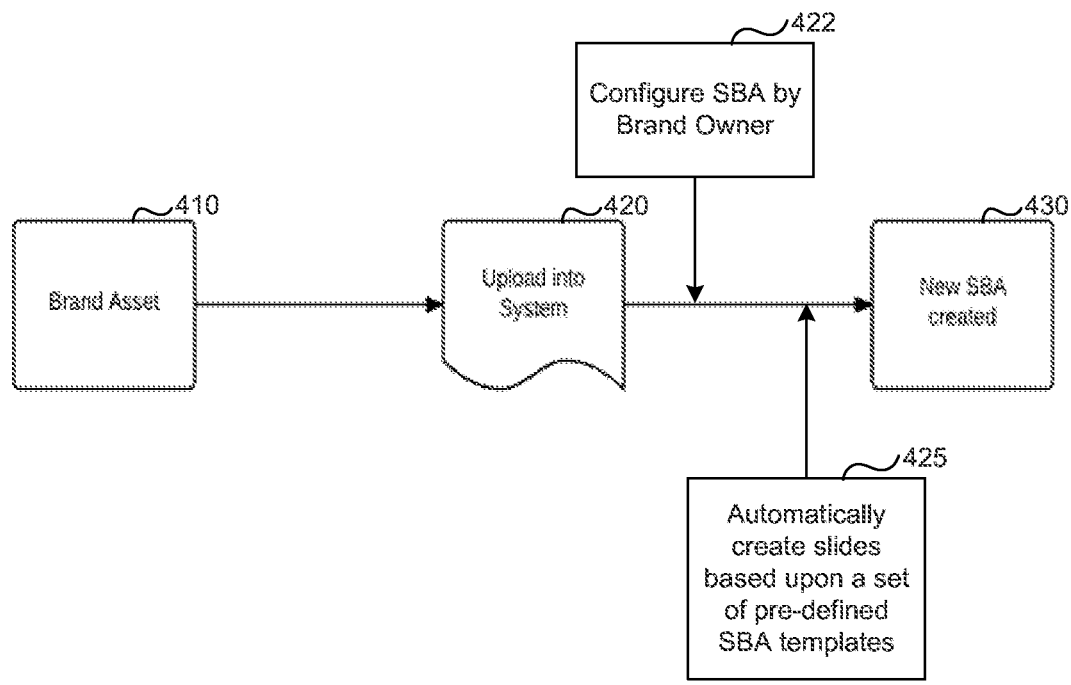
FIG. 4 is an example flow diagram showing creation of a smart brand asset, according to an embodiment of the invention.

FIG. 4 is an example flow diagram showing creation of a smart brand asset, according to an embodiment of the invention. A brand owner can create a smart brand asset by dragging and dropping one or more brand asset into a pre-defined area of a webpage and loading the brand asset into the system. The brand owner can further define the contents and order of the slides in the smart brand asset.

For example, in step 410, the brand owner can drag a file containing a brand asset from their computer desktop or a browser onto a smart brand asset creation pallet, which is a defined area of a webpage. In step 420, the system then uploads the file into the system. In step 430, the system establishes an identification code number for the asset, creates a smart brand asset, and displays it in a smart brand asset editor. The smart brand asset is now ready for review. The brand owner may then choose to publish the smart brand asset by clicking a "Publish" button and the System will create a unique embed code for that smart brand asset and registers the smart brand asset as a published smart brand asset within the system.

In addition, the brand owner can further create the content of the smart brand asset by using the templates provided by the System. Through the proprietary templates, the brand owner can create multiple payload variants for a smart brand asset. As FIG. 4 shows, the brand owner can simply load the selected brand assets into the System in step 420. Optionally the brand owner can further configure the smart brand asset to optimize the payload in step 422. The System in step 425 can automatically create multiple variants of slides based upon a set of pre-defined templates from each group of brand assets and organize the slides into a queue, in order to achieve the best return rate of investment.

Instead of pre-defining the potential choices of variants and manually crafting these variants in HTML by the brand owner or its representative, the System dynamically creates the payload variants automatically. This saves design and prioritization time and delivers a set of variants that are a factorial of the number of assets combinations.

During the process illustrated in FIG. 4, no coding or graphic design skills are required to create a sharable smart brand asset. The process eliminates all unnecessary steps needed for smart brand asset creation from any brand asset. It also applies drag and drop capabilities typically limited to computer-hosted applications to a web-hosted application.

Figure 5:
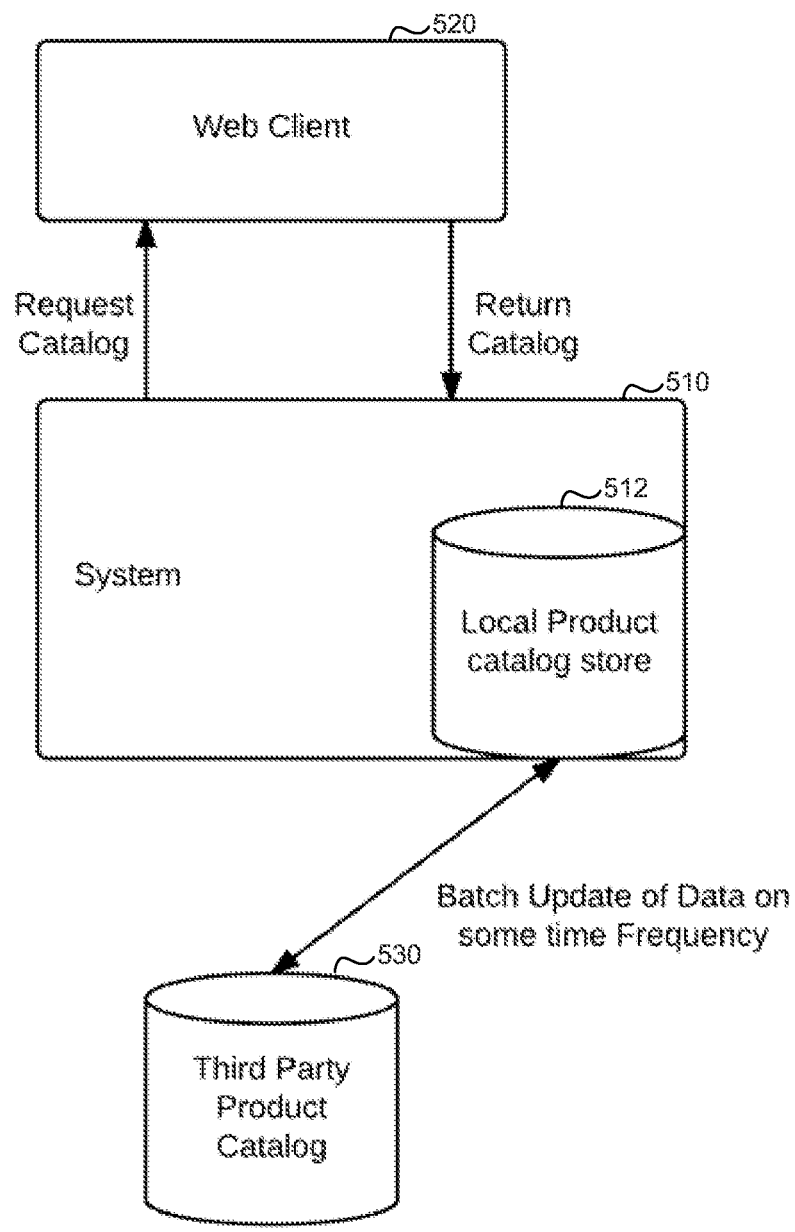
FIG. 5 is a block diagram of showing a smart brand asset system that is database driven, according to an embodiment of the invention.

FIG. 5 is a block diagram of showing a smart brand asset system that is database driven, according to an embodiment of the invention. A brand owner may want to show his entire product offering (or a subset of the offering) where the brand appears, so that the brand always carries an up to date catalog of products to potential buyers. This is particularly relevant when a reseller doesn't want to designate a whole web page to a vendor's product selection and wants the product catalogue to appear from within a single object such as a logo or product photograph.

For example, a single smart brand asset may be created for a given product catalog containing an initial payload and a second payload. The content of the secondary payload is store in a product catalog database 512 of the system 510. When a user clicks on the smart brand asset, the product catalog will be displayed in a lightbox. The database 512 (also referred to as product catalog store) includes rich-media data elements of the secondary payload for the smart brand asset. When a web client 520 tries to load the secondary payload of the smart brand asset, it requests the data elements (also referred to as catalog) from the system 510. The system 510 reads the data elements from the database 512 and returns them to the web client 520. The web client can present the data elements in a layout predefined by the embed code of the smart brand asset. The data elements may be clickable, leading to more specific information about a given clicked area.

There may be a third party product catalog database 530 to supply third party data elements. For example, a smart brand asset may include some data elements created by a third party. The local catalog database 512 can synchronize with the third party product catalog database 530 to update the third party data elements in batches.

Recommendation Engine of Smart Brand Asset Based on Historical Data

Figure 6:
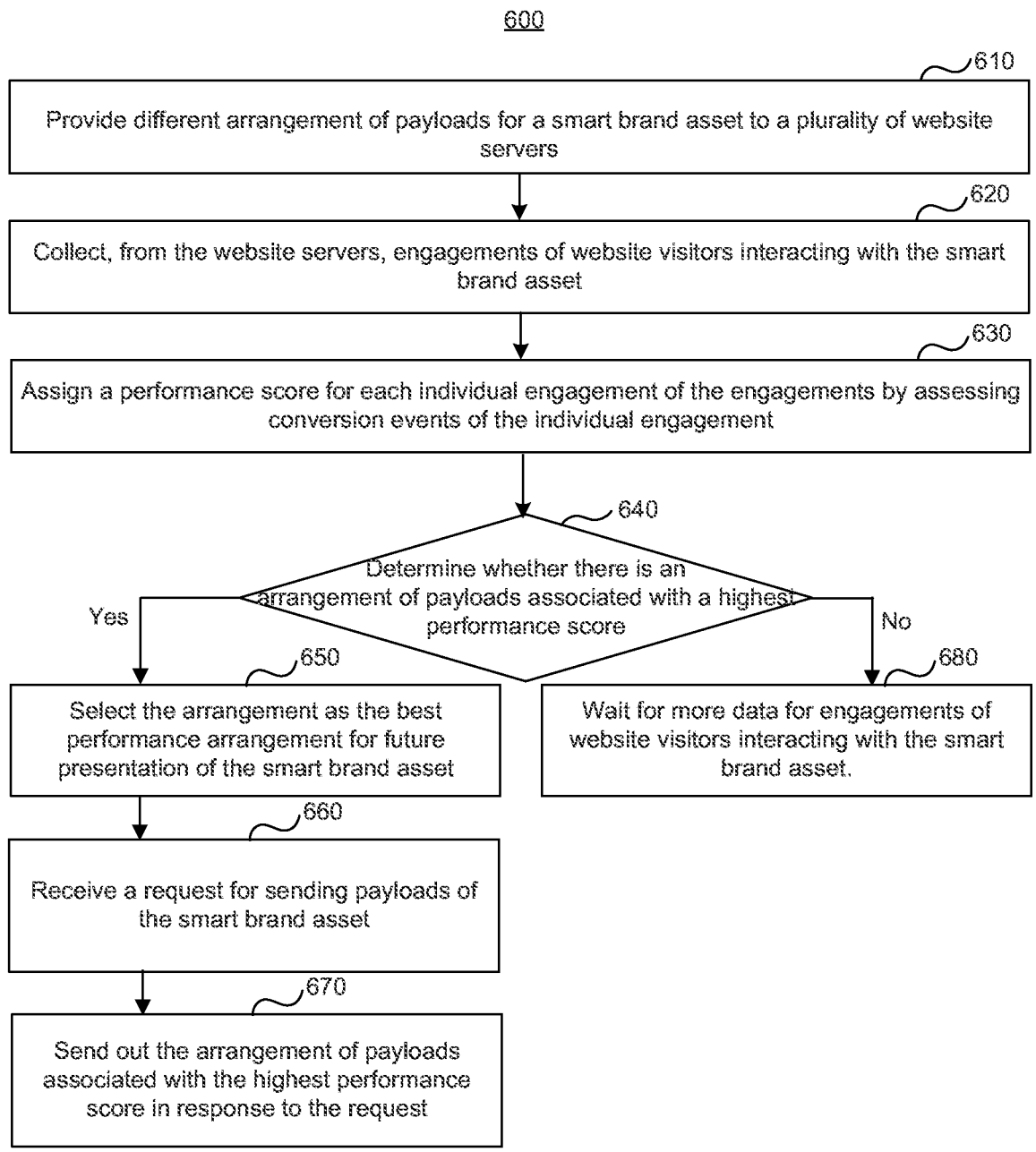
FIG. 6 is an example flow diagram showing a mechanism of a recommendation engine to adjust content appearing within a smart brand asset based on previous user behavior characteristics, according to an embodiment of the invention.

A smart brand asset system can control in real time the content and the presentation of a smart brand asset hosted by a website based on various factors. For example, the smart brand asset system can reorder the content appearing within a smart brand asset based upon previous user behavior characteristics. FIG. 6 is an example flow diagram showing a mechanism of a recommendation engine to adjust content appearing within a smart brand asset based on previous user behavior characteristics, according to an embodiment of the invention. The content adjusting can include, for example, reordering content (e.g., reordering slides or payloads of the smart brand asset), changing content of the smart brand asset, changing page layout of the smart brand asset, or changing product offers.

A brand owner wants his resellers to merchandise his products in a quick and efficient way. To improve overall sales and profitability, the websites of the resellers need to present the smart brand assets with a high conversion rate. The recommendation engine is to help the brand owners who are delivering product feeds to optimize their product catalog presentation to ensure website visitors are presented in the most profitable layout possible. Typically the user behavior across the websites in an dealer network are consistent and can be collected across the entire network of resellers to model shopping/behavior patterns having statistical significances. The recommendation engine determines the feeds for the smart brand asset based on the user behavior patterns.

The recommendation engine collects the data of website visitors interacting with the smart brand asset across the websites hosting the smart brand asset. When a website visitor visits a webpage containing a smart brand asset, the code representing the smart brand asset captures the visitors' interaction with the smart brand asset and sends the data to a brand asset server running the recommendation engine. The recommendation engine aggregates all the information across the websites and determines the arrangement of payloads of the smart brand asset having the best performance across the dealer network. Based upon this data, the System can make recommended changes to content or layout based upon the aggregated behavior of all shoppers.

In step 610, a recommendation engine provides different arrangement of payloads for a smart brand asset to a plurality of website servers. The website server hosts webpages including codes representing the smart brand asset and presenting the different arrangements of payloads. The recommendation engine can be implemented, for example, as a module running at a brand asset server owned by the brand owner.

In step 620, the recommendation engine collects, from the website servers, engagements of website visitors interacting with the smart brand asset. In step 630, the recommendation engine assigns a performance score for each individual engagement of the engagements by assessing conversion events of the individual engagement. An engagement may involve multiple different conversion events. For example, an engagement may include conversion events such as click through rates, mouse hover times, play lengths, number of tabs used, clicking a social engagement button, usage of online chat, commenting or reviewing an offering, or filling out a form within the smart brand asset.

In step 640, the recommendation engine determines whether there is an arrangement of payloads associated with a highest performance score. The arrangement with a highest performance score may be an existing arrangement tested by the previous user interactions, or an arrangement predicted by the analysis. In other words, the arrangement with a highest performance score may be selected among the existing arrangements based on the performance scores, or may be predicted as a new arrangement. If there is no arrangement of payloads determined with a highest performance score, in step 680, the recommendation engine may choose to wait for more data for engagements of website visitors interacting with the smart brand asset.

If there is an arrangement of payloads determined with a highest performance score, in step 650, the recommendation engine selects the arrangement as the best performance arrangement for future presentation of the smart brand asset. In step 660, the recommendation engine receives a request for sending payloads of the smart brand asset. In step 670, the recommendation engine sends out the arrangement of payloads associated with the highest performance score in response to the request.

Recommendation Engine of Smart Brand Asset Based on Click Through Rates

The different arrangements of payloads for the smart brand asset can have different contents, payload priorities, page layouts, or merchandise offers. For example, the websites can be a dealer network for certain products. The recommendation engine collects the shopping pattern data (e.g., click through rates for products and clicking frequency of the products) from the websites. The recommendation engine identifies which products in the smart brand asset that are clicked more often than other products. Based on the click through rates and clicking frequency, the recommendation engine can re-organize the presentation of the products in the smart brand asset. For example, the recommendation engine can move the products having high click through rates to more prominent locations (e.g., top) of the layout of the smart brand asset. The location may contain X/Y coordinates on the page and the page number(s) within the smart brand asset.

Recommendation Engine of Smart Brand Asset Based on Click Through Rates

Figure 7:
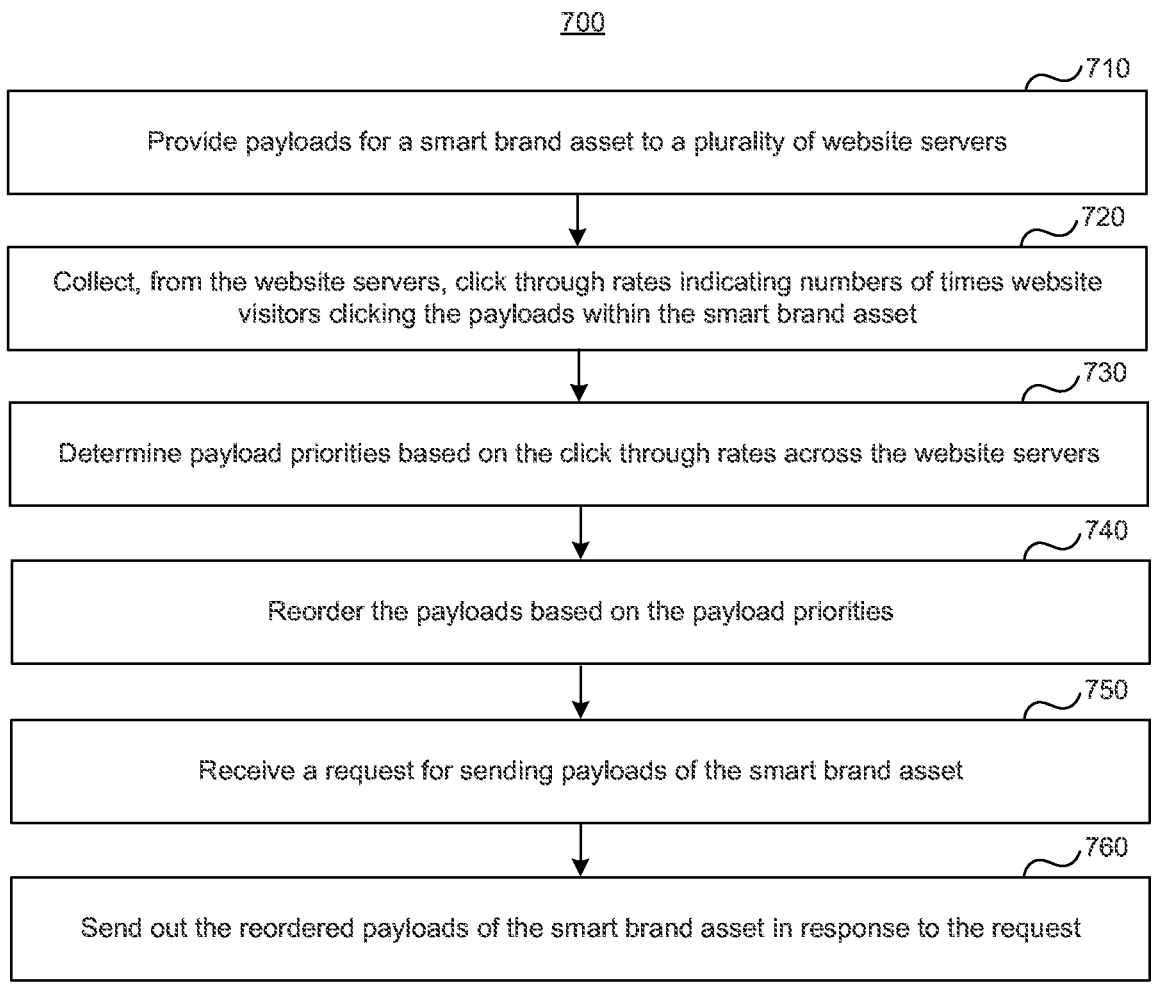
FIG. 7 is an example flow diagram showing a mechanism of a recommendation engine to reorder content appearing within a smart brand asset based on previous user behavior characteristics, according to an embodiment of the invention.

FIG. 7 is an example flow diagram showing a mechanism of a recommendation engine to reorder content appearing within a smart brand asset based on previous user behavior characteristics, according to an embodiment of the invention.

In step 710, a recommendation engine provides payloads for a smart brand asset to a plurality of website servers. The website server hosts webpages including codes representing the smart brand asset. In step 720, the recommendation engine collects, from the website servers, click through rates indicating numbers of times website visitors clicking the payloads within the smart brand asset.

In step 730, the recommendation engine determines payload priorities based on the click through rates across the website servers. In step 740, the recommendation engine reorders the payloads based on the payload priorities. The order of the payloads determines the sequence of the payloads to be displayed in the smart brand asset. In step 750, the recommendation engine receives a request for sending payloads of the smart brand asset. In step 760, the recommendation engine sends out the reordered payloads of the smart brand asset in response to the request.

Optimizing Smart Brand Asset Content Based on Website Characteristics

Figure 8:
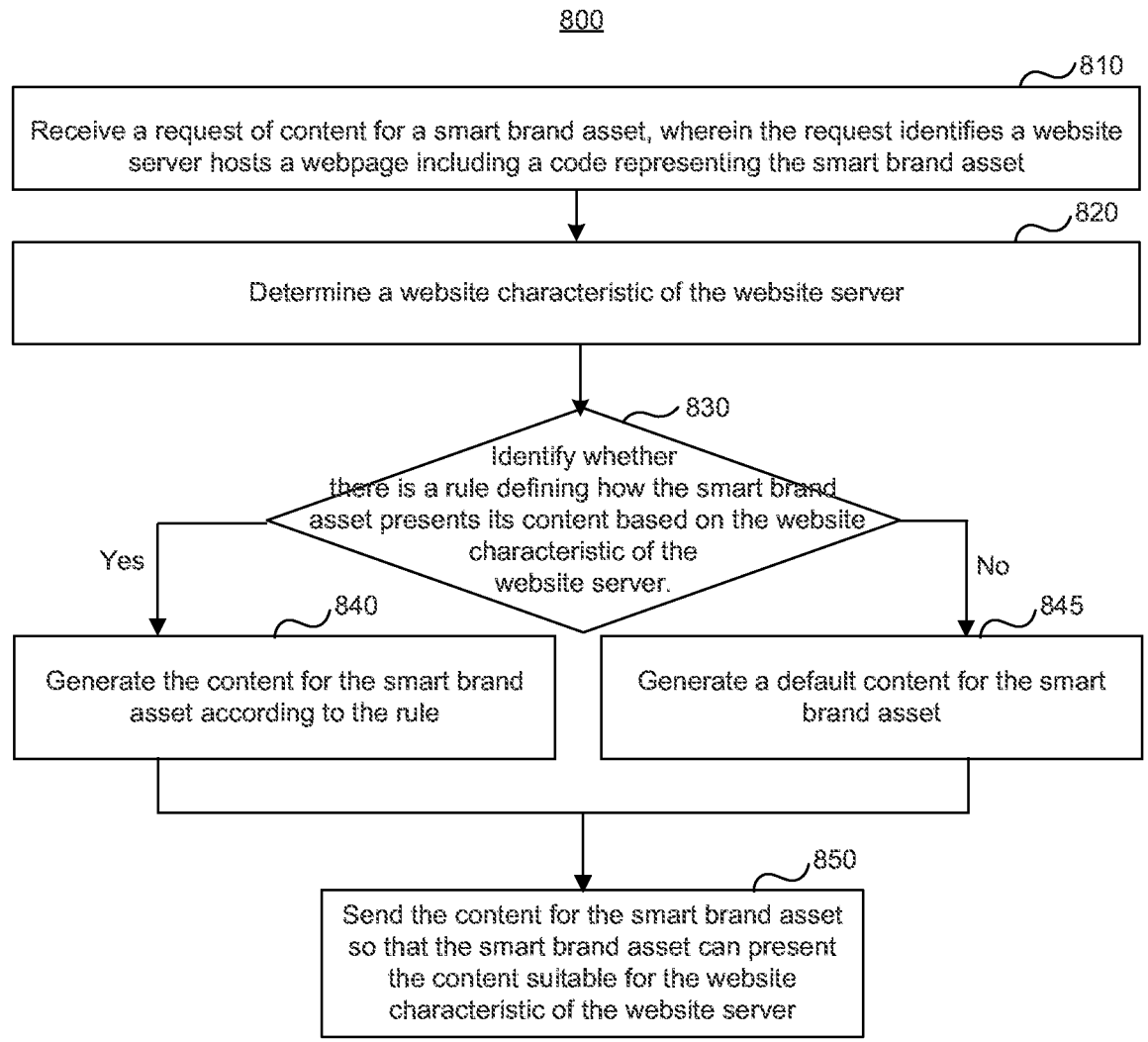
FIG. 8 is an example flow diagram showing a mechanism for optimizing content of smart brand assets based on various characteristics of hosting websites.

The brand owner may prefer that wherever a smart brand asset is presented to a user of a website, the content of the smart brand asset is optimized so that the smart brand asset can deliver a high return on marketing investment and a high conversion rate. FIG. 8 is an example flow diagram showing a mechanism for optimizing content of smart brand assets based on various characteristics of hosting websites. The characteristics to be used for determining content of the smart brand asset can include geographical location, categorized type of the website, or even blacklist of forbidden websites.

In step 810, a brand asset server receives a request of content for a smart brand asset, wherein the request identifies a website server hosts a webpage including a code representing the smart brand asset. In step 820, the brand asset server determines a website characteristic of the website server. The website characteristic helps an owner of the smart brand asset to decide the content for the smart brand asset.

In step 830, the brand asset server identifies whether there is a rule defining how the smart brand asset presents its content based on the website characteristic of the website server. If so, in step 840, the brand asset server generates the content for the smart brand asset according to the rule. If there is no rule defining how the smart brand asset presents its content based on the website characteristic of the website server, in step 845, the brand asset server may choose to generate a default content for the smart brand asset. In step 850, the brand asset server sends the content for the smart brand asset so that the smart brand asset can present the content suitable for the website characteristic of the website server.

Optimizing Smart Brand Asset Content Based on Geographical Location

Figure 9:
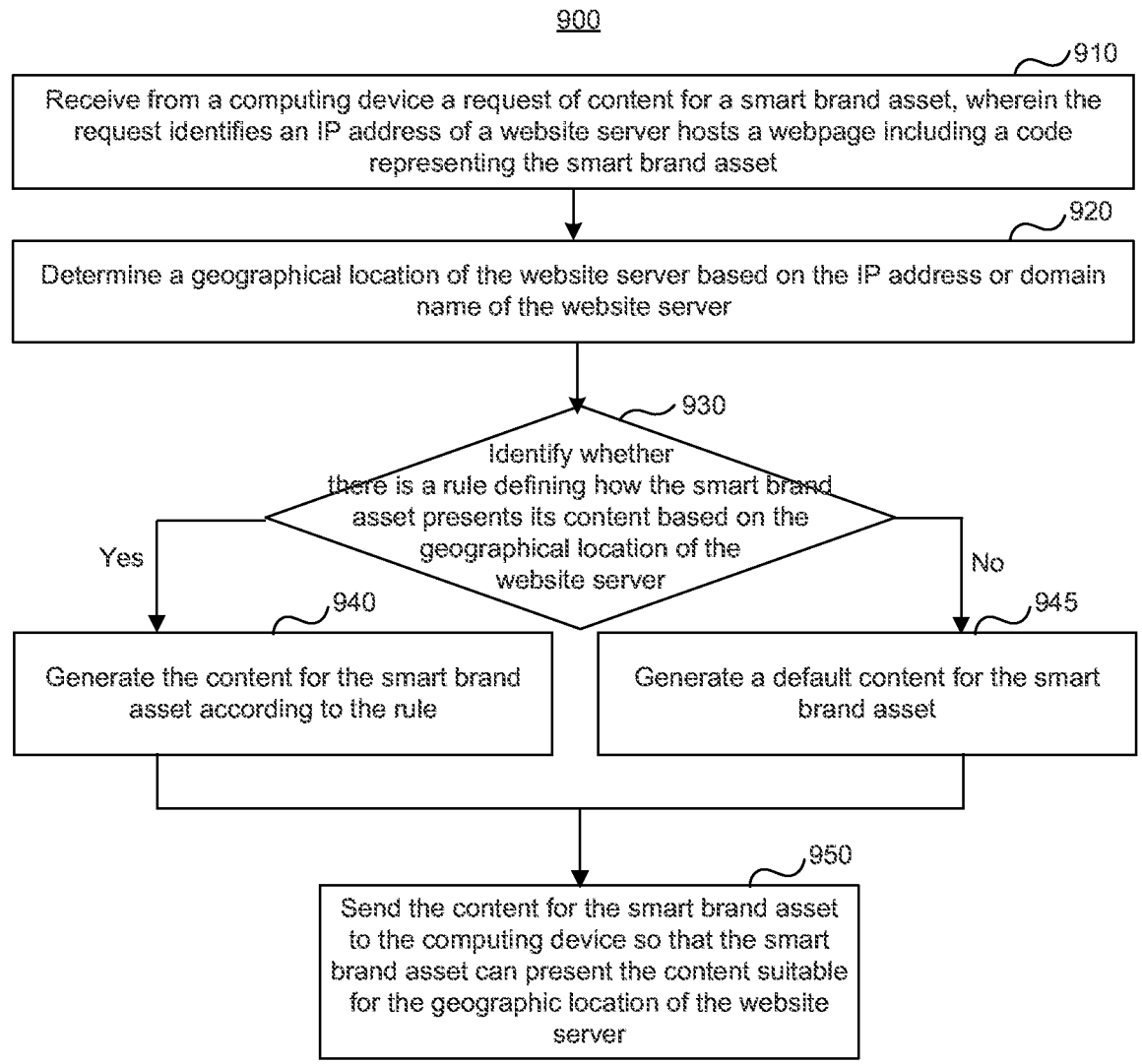
FIG. 9 is an example flow diagram showing a mechanism for optimizing content of smart brand assets based on the geographical location of the hosting website.

The characteristics of the hosting websites can include geographical locations of the websites and/or geographical locations of the users visiting the websites. FIG. 9 is an example flow diagram showing a mechanism for optimizing content of smart brand assets based on the geographical location of the hosting website.

The brand asset server is able to dynamically deliver content that is optimized by the location of the website displaying the smart brand asset. For instance, when phone numbers such as 1-800 numbers can be displayed in the smart brand asset based on the location of the website. Appropriate phone number can be displayed based upon the IP Address or domain name of a website hosting an embedded smart brand asset code. Another example is when a company wants to target their message towards specific geographical segments. For example, a nationwide campaign for the NFL could generate different smart brand asset content by region. The content about Dallas Cowboys can be shown when a website is hosted in Dallas region or the content about San Francisco 49ers can be shown in San Francisco-based website.

Using a computing device, a website visitor loads a webpage containing a code representing a smart brand asset. The browser application executes the code to transmit a request to a brand asset server. In step 910, a brand asset server receives from a computing device a request of content for a smart brand asset, wherein the request identifies an IP address of a website server hosts a webpage including a code representing the smart brand asset. Alternatively, the request can identify a domain name of the website or other website characteristic helps to identify the geographical location of the website.

In step 920, the brand asset server determines a geographical location of the website server based on the IP address or domain name of the website server. For instance, the brand asset server may access an internal or external database recording the relationships between the geographical locations and IP addresses or domain names.

The IP address or domain name of the website can be collected by the code representing the smart brand asset. When the code is executed by a browser application running on the computing device, the code detects the IP address or domain name of the website server.

In step 930, the brand asset server identifies whether there is a rule defining how the smart brand asset presents its content based on the geographical location of the website server. A database may record the rules defining relationships between geographical locations and different contents for the smart brand asset. In some circumstances, the rule determines that the content for the smart brand asset conforms to policies and regulations of the geographical location. Therefore, the content according to the rule would block an offer that might otherwise violate a specific location-centric regulation. The brand owner or the creator of the smart brand asset can create the rule determining the smart brand asset content. For instance, the rule may determine which 800 phone number to be displayed in the smart brand asset based on the geographical location. If there is such rule, in step 945, the brand asset server may choose to generate a default content for the smart brand asset.

If there is such a rule, in step 940, the brand asset server generates the content for the smart brand asset according to the rule. In step 950, the brand asset server sends the content for the smart brand asset to the computing device so that the smart brand asset can present the content suitable for the geographic location of the website server. For example, the content for the smart brand asset can comprise a contact phone number or a promotion message targeting to the geographical location.

Companies that wish to have content that extends across geographic regions can now have the ability to dynamically deliver call to action telephone numbers that will work economically in that particular region. For example, US 800 numbers do not work overseas. With the ability to dynamically display the phone number based on the geographical location, a smart brand asset hosted a foreign country's website can display a locally available telephone number. The smart brand asset can further avoid displaying certain content that is illegal or inappropriate for certain geographical regions.

Figure 10:
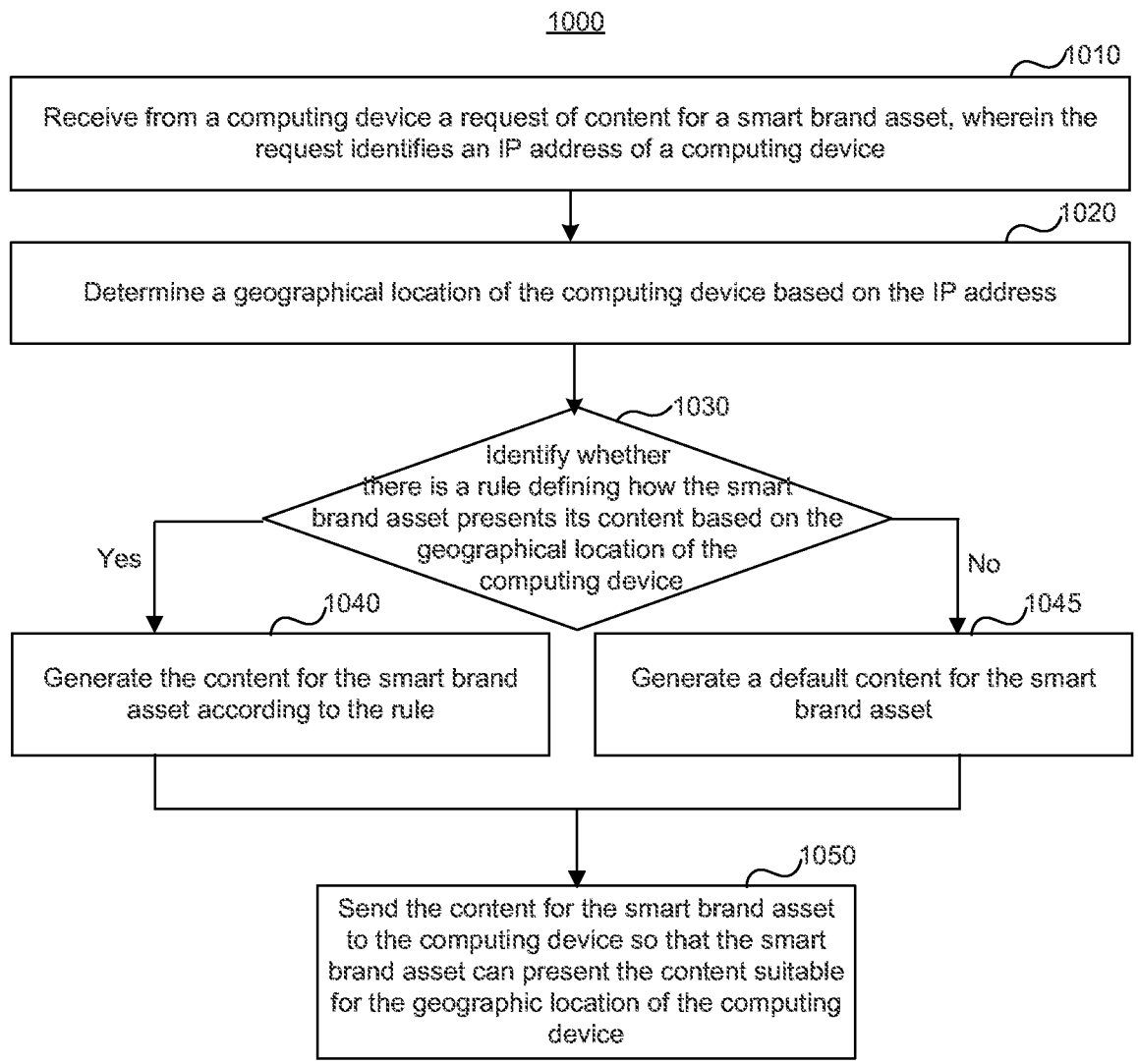
FIG. 10 is an example flow diagram showing a mechanism for optimizing content of smart brand assets based on the geographical location of the website visitor.

Similarly, geographical locations of users visiting the website can be also used to determine the smart brand asset content. FIG. 10 is an example flow diagram showing a mechanism for optimizing content of smart brand assets based on the geographical location of the website visitor.

Using a computing device, a website visitor loads a webpage containing a code representing a smart brand asset. The browser application executes the code to transmit a request to a brand asset server. An IP address of the computing device of the website visitor can be collected by the code representing the smart brand asset. When the code is executed by a browser application running on the computing device, the code detects the IP address of the computing device.

In step 1010, a brand asset server receives from a computing device a request of content for a smart brand asset, the request identifying an IP address of a computing device. The computing device renders a webpage including a code representing the smart brand asset. Alternatively, the request can identify other characteristic helps to identify the geographical location of the computing device, such as the WiFi network or cellphone network that the computing device uses. If the computing device is a mobile phone, the request can includes information from the location service of the mobile phone.

In step 1020, the brand asset server determines a geographical location of the computing device based on the IP address. For instance, the brand asset server may access an internal or external database recording the relationships between the geographical locations and IP addresses.

In step 1030, the brand asset server identifies whether there is a rule defining how the smart brand asset presents its content based on the geographical location of the computing device. A database may record the rules defining relationships between geographical locations and different contents for the smart brand asset. In some circumstances, the rule determines that the content for the smart brand asset conforms to policies and regulations of the geographical location. Therefore, the content according to the rule would block an offer that might otherwise violate a specific location-centric regulation. If there is such rule identified, in step 1045, the brand asset server may choose to generate a default content for the smart brand asset.

If there is such a rule, in step 1040, the brand asset server generates the content for the smart brand asset according to the rule. In step 950, the brand asset server sends the content for the smart brand asset to the computing device so that the smart brand asset can present the content suitable for the geographic location of the computing device. For example, the content for the smart brand asset can comprise a contact phone number or a promotion message targeting to the geographical location where the computing device locates.

Optimizing Smart Brand Asset Content Based on Website Type

The characteristics of the hosting websites can include a type of the website server determined by a list of type categories having domain names associated with the type categories. The content for the smart brand asset can be generated by selecting different payload based on the type of the website server. The type categories can be defined based on the purposes of websites, such as news site, commerce site, blog site, etc. Alternatively, the type categories can be defined based on the general contents or topics of the websites, such as sports website, history website, fashion website, etc.

Figure 11:
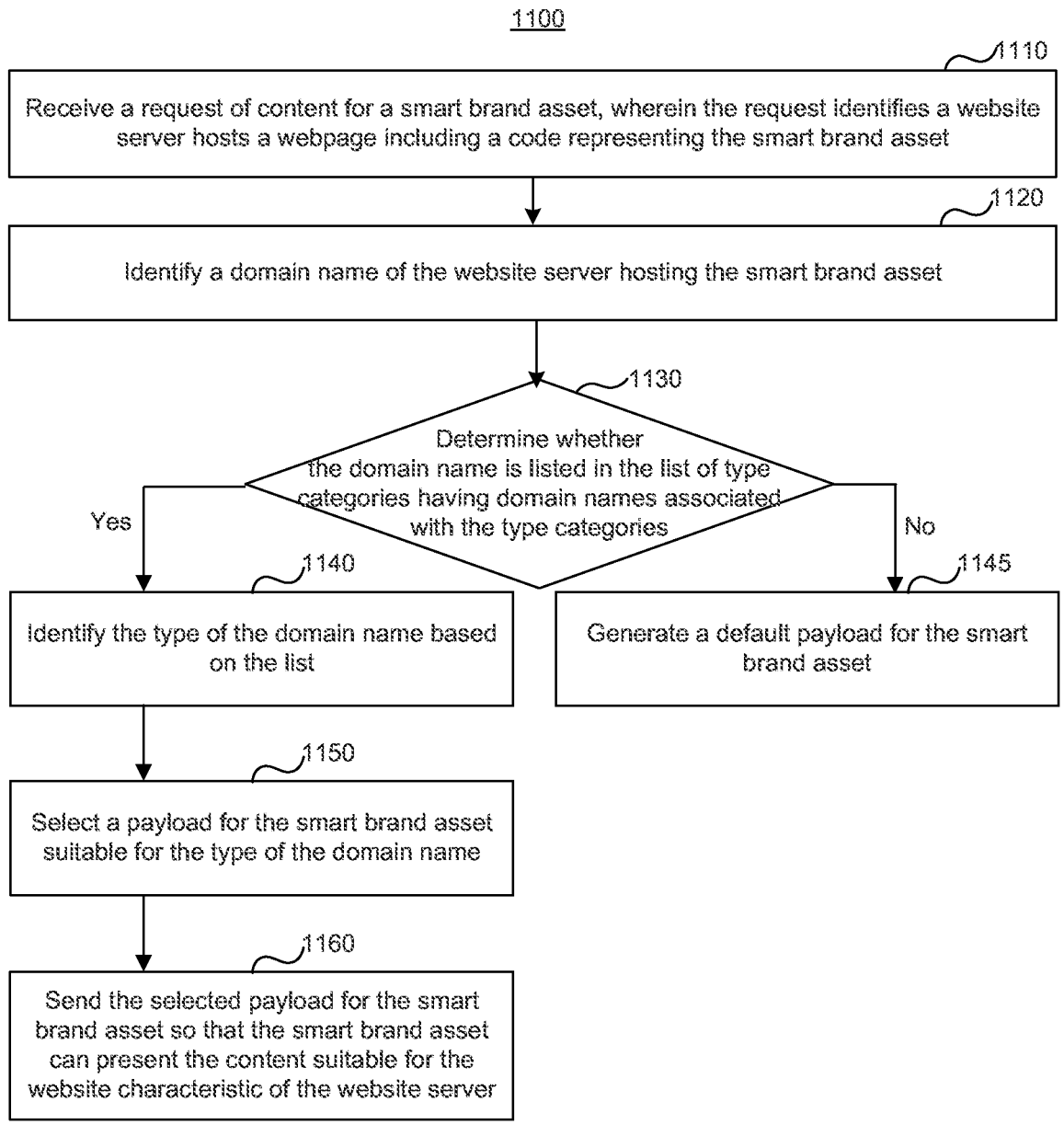
FIG. 11 is an example flow diagram showing a mechanism for optimizing content of smart brand assets based on the type of the hosting website.

FIG. 11 is an example flow diagram showing a mechanism for optimizing content of smart brand assets based on the type of the hosting website. In step 1110, a brand asset server receives a request of content for a smart brand asset, the request identifying a website server hosts a webpage including a code representing the smart brand asset. In step 1120, the brand asset server identifies a domain name of the website server hosting the smart brand asset.

In step 1130, the brand asset server determines whether the domain name is listed in the list of type categories having domain names associated with the type categories. The brand owner may create such a list of type categories and specify the website domain names associated with the categories. If the domain name is not listed, in step 1145, the brand asset server may choose to select a default payload for the smart brand asset.

If the domain name is listed, in step 1140, the brand asset server identifies the type of the domain name based on the list. In step 1150, the brand asset server selects a payload for the smart brand asset suitable for the type of the domain name. In step 1160, the brand asset server sends the selected payload for the smart brand asset so that the smart brand asset can present the content suitable for the website characteristic of the website server.

Brand owner wants to deliver targeted marketing message to website visitors. By optimizing the content based on the geographical locations of the visitors, the smart brand asset can deliver relevant messages to the visitors and achieve a high marketing return of investment.

Optimizing Smart Brand Asset Content Based on Website Blacklist

The characteristics of the hosting websites can also include a forbidden type of the website server determined by a website blacklist. The brand owner of the smart brand asset may select a blacklist of websites that are illegal or inappropriate for displaying the content of the smart brand asset. For instance, the blacklisted websites may be porn sites, malware sites, or phishing sites on which the brand owner refuses to present the smart brand asset. Alternatively, such a blacklist of websites is provided by a third-party so that the brand owner does not need to compile the blacklist by himself.

By blocking the content of the smart brand asset from showing on these blacklisted websites, the brand owner protects the brand from inappropriate associates and misuses of the brand assets. The brand owner has the control on whether the smart brand asset content is blocked on the blacklisted websites. The brand owner is able to shut off manually or automatically their brand asset on any website.

The website owner or operator does not have the ability to stop it, because the brand asset server controls the delivery of the content.

Figure 12:
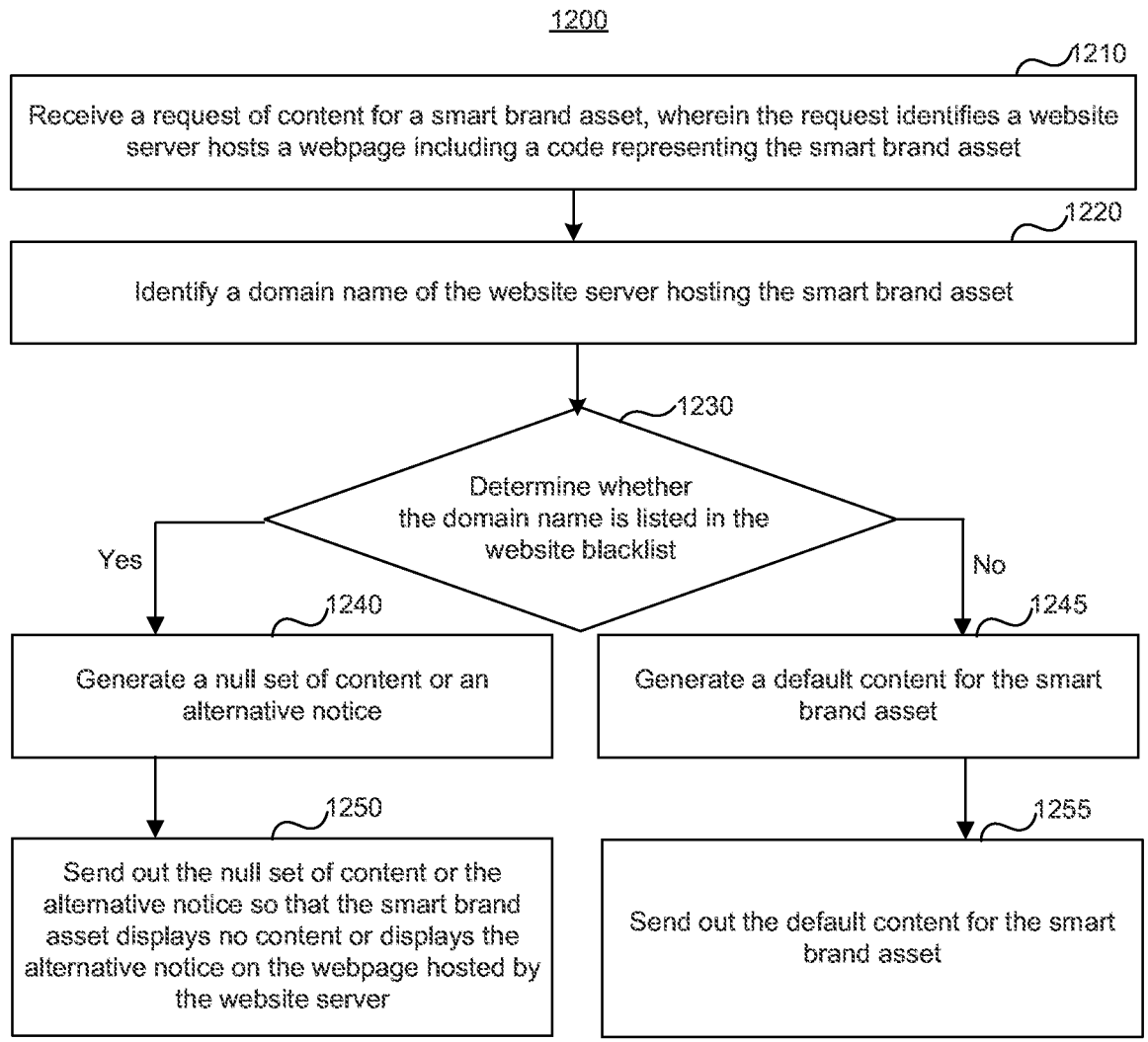
FIG. 12 is an example flow diagram showing a mechanism for optimizing content of smart brand assets based on a website blacklist.

FIG. 12 is an example flow diagram showing a mechanism for optimizing content of smart brand assets based on the website blacklist. In step 1110, a brand asset server receives a request of content for a smart brand asset, the request identifying a website server hosts a webpage including a code representing the smart brand asset. In step 1220, the brand asset server identifies a domain name of the website server hosting the smart brand asset.

In step 1230, the brand asset server determines whether the domain name is listed in the website blacklist. If the domain name is listed, in step 1240, the brand asset server generates a null set of content. Alternatively, the brand asset server can generates an alternative notice suggesting that the content of the smart brand asset has been removed. For example, the alternative notice may contain language of "this material has been removed." If the domain name is not listed in the blacklist, in step 1245, the brand asset server may choose to generate a default content for the smart brand asset.

In step 1250, the brand asset server sends out the null set of content or the alternative notice so that the smart brand asset displays no content or displays the alternative notice on the webpage hosted by the website server.

The brand owner has the control of content of the smart brand asset, even when webpages containing the smart brand asset are hosted by websites not owned by the brand owner. Based on the blacklist, the brand asset server can automatically audit the user of the smart brand assets and shut off the content delivery to any blacklisted website.

Searching and Replacing Static References

The smart brand asset system can provide a code for the website server to automatically replace static references to brand assets in webpages with smart brand assets. Once the static references are replaced, the brand owner will have the control of the content being displayed in the smart brand assets.

Figure 13:
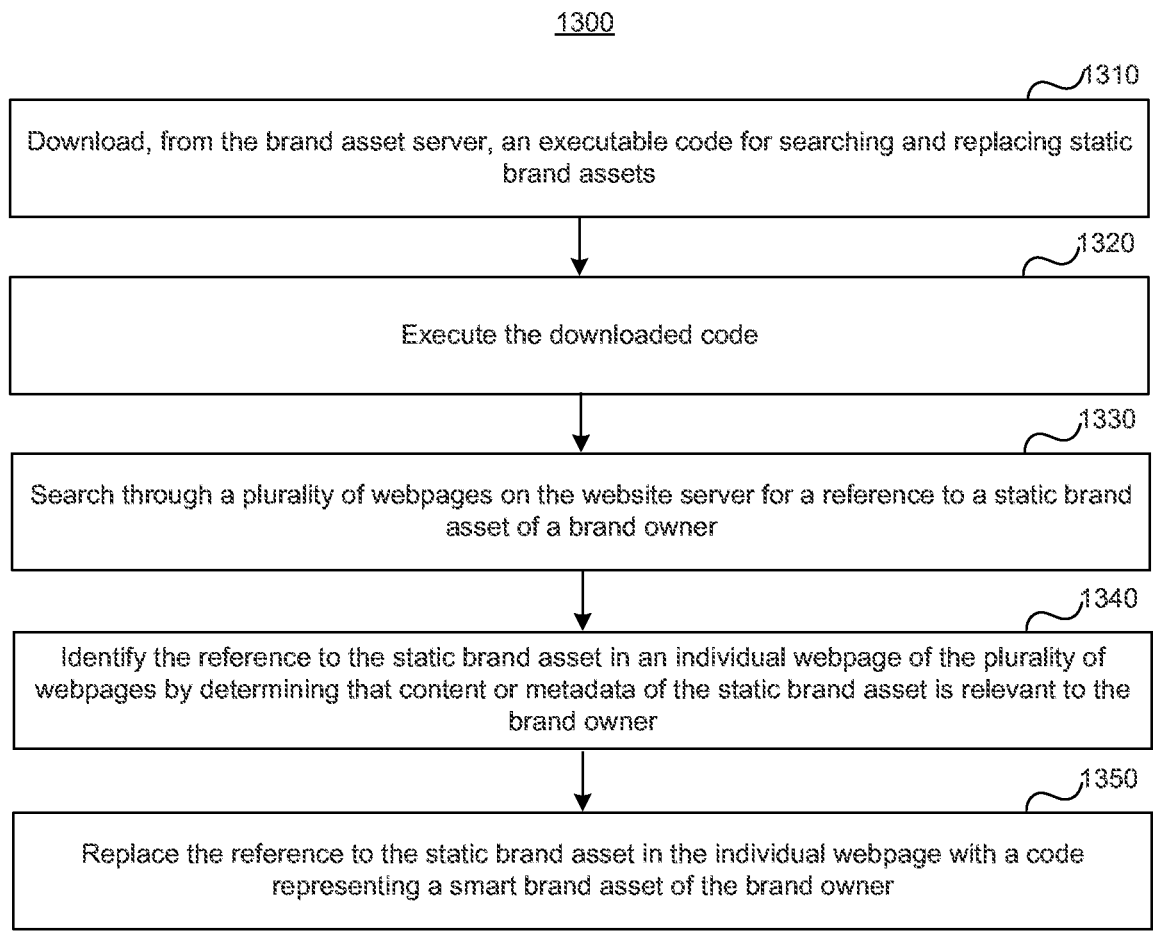
FIG. 13 is an example flow diagram showing a mechanism for searching and replacing static references of brand assets.

FIG. 13 is an example flow diagram showing a mechanism for searching and replacing static references. In step 1310, a website server downloads, from the brand asset server, an executable code for searching and replacing static brand assets. In step 1320, the website server executes the downloaded code. In step 1330, the website server searches through a plurality of webpages on the website server for a reference to a static brand asset of a brand owner. The static brand asset can include, for example, a static object represented by a document object model (DOM) in the individual webpage.

In step 1340, the website server identifies the reference to the static brand asset in an individual webpage of the plurality of webpages by determining that content or metadata of the static brand asset is relevant to the brand owner. The website server can identifies the relevant static brand asset based on various types of metadata such as filename, file attribute, description, or owner entity tag.

In step 1350, the website server replaces the reference to the static brand asset in the individual webpage with a code representing a smart brand asset of the brand owner. The smart brand asset code instructs the website server to retrieve content slides of the smart brand asset from the brand asset server and to present the content slides of the smart brand assert in a section of the individual webpage. The brand asset server dynamically provides content slides of the smart brand asset when a browser application renders the individual webpage including the smart brand asset. The website server does not have control or access to the content slides of the smart brand asset.

Exemplary Digital Data Processing Apparatus

Figure 14:
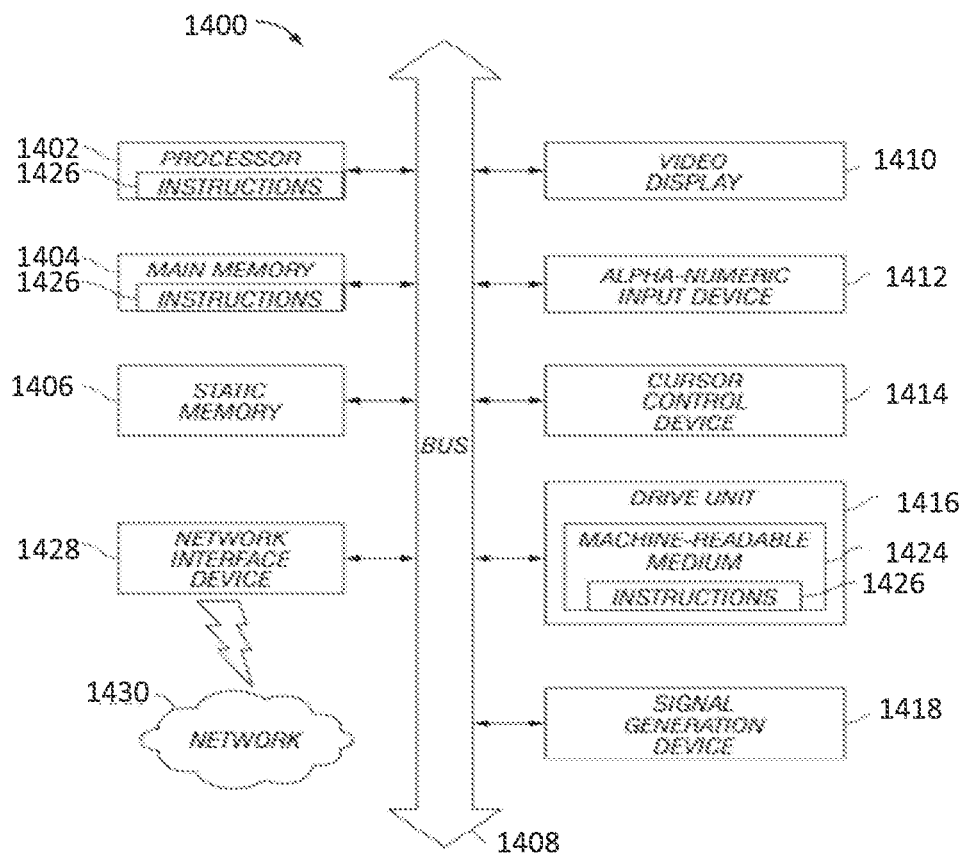
FIG. 14 is a block schematic diagram of a machine, according to an embodiment of the invention.

Embodiments of the invention may be implemented using a digital data processing apparatus. As a specific example, FIG. 14 shows a digital data processing apparatus 1400. The apparatus 1400 includes a processor 1402, such as a microprocessor, personal computer, mobile phone or other mobile personal computing device, workstation, controller, microcontroller, state machine, or other processing machine, coupled to a digital data storage 1404. In the present example, the storage 1404 includes a fast-access storage 1406, as well as nonvolatile storage 1408. The fast-access storage 1406 may be used, for example, to store the programming instructions executed by the processor 1402. The storage 1406 and 1408 may be implemented by various devices. Many alternatives are possible. For instance, one of the components 1406, 1408 may be eliminated; furthermore, the storage 1404, 1406, and/or 1408 may be provided on-board the processor 1402, or even provided externally to the apparatus 1400.

The apparatus 1400 also includes an input/output 1410, such as a connector, line, bus, cable, buffer, electromagnetic link, network, modem, transducer, IR port, antenna, or other means for the processor 1402 to exchange data with other hardware external to the apparatus 1400.

Various instances of digital data storage may be used to embody the storage 1404 and 1408, and for other purposes. Depending upon its application, this digital data storage may be used for various functions, such as storing data, or to store machine-readable instructions. These instructions may themselves aid in carrying out various processing functions, or they may serve to install a software program upon a computer, where such software program is then executable to perform other functions related to this disclosure.

In any case, the storage media may be implemented by nearly any mechanism to digitally store machine-readable signals. One example is optical storage such as CD-ROM, WORM, DVD, digital optical tape, disk storage, or other optical storage. Another example is direct access storage, such as a conventional "hard drive", redundant array of inexpensive disks ("RAID"), or another direct access storage device ("DASD"). Another example is serial-access storage such as magnetic or optical tape. Still other examples of digital data storage include electronic memory such as ROM, EPROM, flash PROM, EEPROM, memory registers, battery backed-up RAM, etc.

An exemplary storage medium is coupled to a processor so the processor can read information from, and write information to, the storage medium. In the alternative, the storage medium may be integral to the processor. In another example, the processor and the storage medium may reside in an ASIC or other integrated circuit.

Other Embodiments

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

Furthermore, although elements of the invention may be described or claimed in the singular, reference to an element in the singular is not intended to mean "one and only one" unless explicitly so stated, but shall mean "one or more". Additionally, ordinarily skilled artisans will recognize that operational sequences must be set forth in some specific order for the purpose of explanation and claiming, but the present invention contemplates various changes beyond such specific order.

What is claimed is:

1. A computer-implemented method for providing payloads for a smart brand asset, comprising:
   a processor providing, to a plurality of website servers, different arrangements of payloads for the smart brand asset, wherein said plurality of website servers host webpages including codes representing the smart brand asset and presenting the different arrangements of payloads;
   said processor placing a unique embed code on web pages in lieu of an image reference to represent the smart brand asset;
   said processor calling and executing a script when a web page containing a smart brand asset embed code is rendered;
   responsive to said script, said processor loading an initial payload of the smart brand asset into a web browser;
   said processor determining an arrangement of payloads, wherein determining an arrangement of the payloads comprises:
      assigning a higher payload priority for payloads with a higher value performance score, said performance score determined for each individual engagement of website visitors interacting with the smart brand asset by assessing conversion events of the individual engagement;
      reordering the payloads based on the payload priorities to determine a sequence of the payloads to be displayed in the smart brand asset;
      initially placing a first payload with a higher payload priority on a webpage;
      detecting a conversion event for the first payload;
      when a conversion event for the first payload is detected, placing a second payload with a lower payload priority on the webpage;
   said processor determining an arrangement of payloads; and
   said processor sending the arrangement of payloads in response to a request.

2. The method of claim 1, wherein the different arrangements of payloads for the smart brand asset have different contents, payload priorities, page layouts, or merchandise offers.

3. The method of claim 1, wherein the arrangement of payloads associated with a highest performance score is determined by selecting an individual engagement of the engagements based on the performance scores.

4. The method of claim 1, wherein the arrangement of payloads associated with a highest performance score is determined by predicting an arrangement of payloads based on the different arrangements of payloads having the performance scores.

5. The method of claim 1, wherein the conversion events of each individual engagement include click through rates, mouse hover times, play lengths, number of tabs used, clicking a social engagement button, engaging in an online chat session, adding a comment to a content, filling out a form or similar within the smart brand asset.

6. The method of claim 1, wherein each conversion event includes records of click through rates indicating a number of times or frequency that website visitors click the payloads within the smart brand asset.

7. The method of claim 1, wherein the arrangement with a highest performance score may be an existing arrangement tested by previous user interactions, or an arrangement predicted by an analysis.

8. The method of claim 1, wherein more data is collected for engagements of website visitors interacting with the smart brand asset when there is no arrangement of payloads determined with a highest performance score.

9. A computer-implemented method for providing payloads for a smart brand asset, the method comprising:
   providing payloads for a smart brand asset to a plurality of website servers, the website servers including code representing the smart brand asset;
   collecting, from the website servers, conversion events associated with the payloads;
   determining payload priorities for the website servers based on the conversion events;
   assigning a higher payload priority for payloads with a higher value performance score, said performance score determined for each individual engagement of website visitors interacting with the smart brand asset by assessing conversion events of the individual engagement;
   reorganizing the payloads based on the payload priorities;
   initially placing a first payload with a higher payload priority on a webpage;
   detecting a conversion event for the first payload;
   when a conversion event for the first payload is detected, placing a second payload with a lower payload priority on the webpage;
   receiving a request for sending payloads of the smart brand asset; and
   sending out reordered payloads of the smart brand asset in response to the request.

10. The method of claim 9, wherein the payload includes one or more of: product image, product brochure, textual content, product logo, product video, and training materials.

11. The method of claim 9, wherein the payload includes code that dynamically references one or more of: images, videos, interactive software code, product brochures, and code embedded from other websites.

12. The method of claim 9, wherein the payload includes buttons or menus for web browsing navigation.

13. The method of claim 9, wherein the conversion event includes click through rates indicating a number of times or frequency that website visitors click the payloads within the smart brand asset.

14. The method of claim 9, wherein the conversion event includes one or more of:
   a mouse hover, media playback, a social engagement button interaction, online chat session interaction, comment interaction, and form interaction.

15. The method of claim 9, wherein the payload priority is higher for payloads with a higher value conversion event.

16. The method of claim 9, wherein reorganizing the payloads includes reordering the payloads based on the payload priorities, wherein an order of the payloads determines a sequence of the payloads to be displayed in the smart brand asset.

17. The method of claim 16, wherein the reordered payloads include a first payload with a higher payload priority that is initially placed on a webpage and a second payload with a lower payload priority placed on the webpage after a conversion event for the first payload is detected.

18. The method of claim 17, wherein the second payload with a lower payload priority is placed in an overlay showing the second payload displayed on top of a current web page and a rest of the current web page content may be darkened.

19. The method of claim 9, wherein reorganizing the payloads includes placing a payload with a higher payload priority in a more prominent location of a website.

20. A computer system comprising:
   a processor;
   a network interface coupled to the processor; and
   a memory coupled to the processor and having instructions executable by the processor to cause a server to:
      provide, to a plurality of website servers, different arrangements of payloads for a smart brand asset, said smart brand asset comprising an interactive container of brand assets, wherein a plurality of website servers host webpages including codes representing the smart brand asset and presenting the different arrangements of payloads;
      place a unique embed code on web pages in lieu of an image reference to represent the smart brand asset:
      collect, from the website servers, engagements of website visitors interacting with the smart brand asset, said engagements including conversion events;
      assign a performance score for each individual engagement of the engagements by assessing conversion events of the individual engagement;
      determine an arrangement of payloads associated with a highest performance score, wherein determining an arrangement of the payloads comprises:
         assigning a higher payload priority for payloads with a higher value performance score;
         reordering the payloads based on the payload priorities to determine a sequence of the payloads to be displayed in the smart brand asset;
         initially placing a first payload with a higher payload priority on a webpage;
         detecting a conversion event for the first payload;
         when a conversion event for the first payload is detected, placing a second payload with a lower payload priority on the webpage;
      receive a request for sending payloads of the smart brand asset; and
      send the arrangement of in response to the request.

21. The computer system of claim 20, wherein the conversion event includes click through rates indicating a number of times or frequency that website visitors click the payloads within the smart brand asset.

22. The system of claim 20, further comprising:
   said processor receiving a request of content for a smart brand asset;
   said processor using said request to identify a website server;
   said processor determining a website characteristic of the website server, wherein said determining a website characteristic of the website server comprises:
      said processor identifying a domain name of the website server hosting the webpage hosting the smart brand asset;
      said processor determining whether the domain name is listed in a list of type categories containing associated domain names, said type categories comprising any of a purpose of the websites and general contents or topics of the websites;
      said processor identifying a type of the domain name based on the list of type categories containing associated domain names; and
      said processor selecting a payload for the smart brand asset suitable for the identified type of the domain name;
   said processor identifying a rule defining how the smart brand asset presents its content based on the website characteristic of the website server;
   said processor generating the content for the smart brand asset according to the rule;
   said processor sending the content for the smart brand asset in response to the request; and
   said processor presenting the content of the smart brand asset in a format that is suitable for the website characteristic of the website server.

23. The system of claim 22, wherein the website characteristic of the website server comprises a geographical location to which the content for the smart brand asset is targeted, and wherein the content for the smart brand asset is relevant to the geographical location.

24. The system of claim 23, wherein geographical location is indicated by an IP address of the website server, a domain name of the website server, or an IP address of a user device visiting the webpage hosted by the website server.

25. The system of claim 24, wherein the code representing the smart brand asset, when executed by a browser application, detects the IP address of the website server or the user device visiting the webpage hosted by the website server.

26. The system of claim 23, wherein the content for the smart brand asset comprises a contact phone number or a promotion message targeting to the geographical location.

27. The system of claim 23, wherein the rule specifies that the content for the smart brand asset conforms to policies and regulations of the geographical location.

28. The system of claim 23, wherein a database records the rules defining relationships between geographical locations and different contents for a smart brand asset.

* * * * *